C. E. WICKHAM.
AUTOMOBILE SIGNAL.
APPLICATION FILED MAY 5, 1915.
1,299,080.
Patented Apr. 1, 1919.
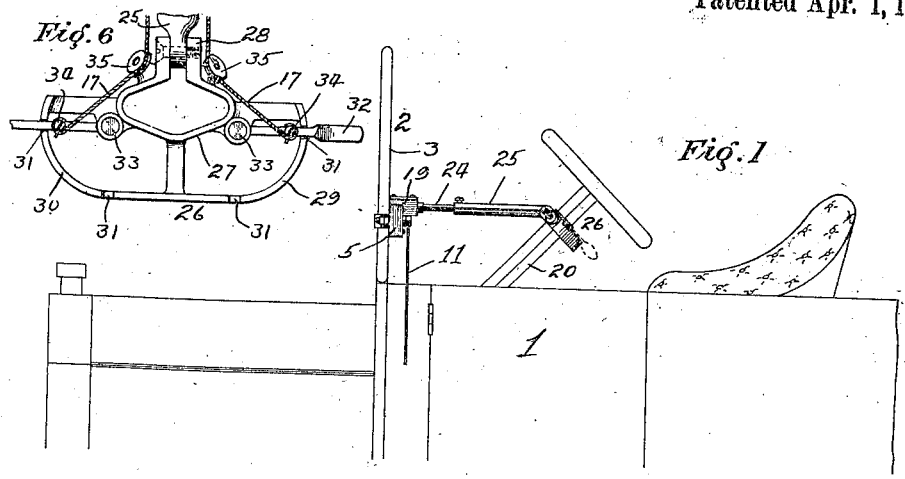
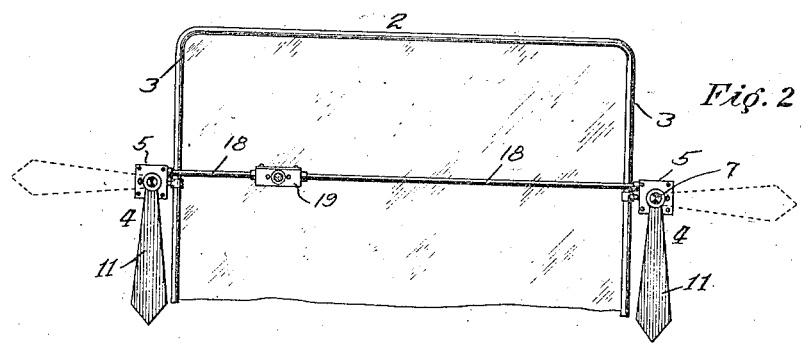
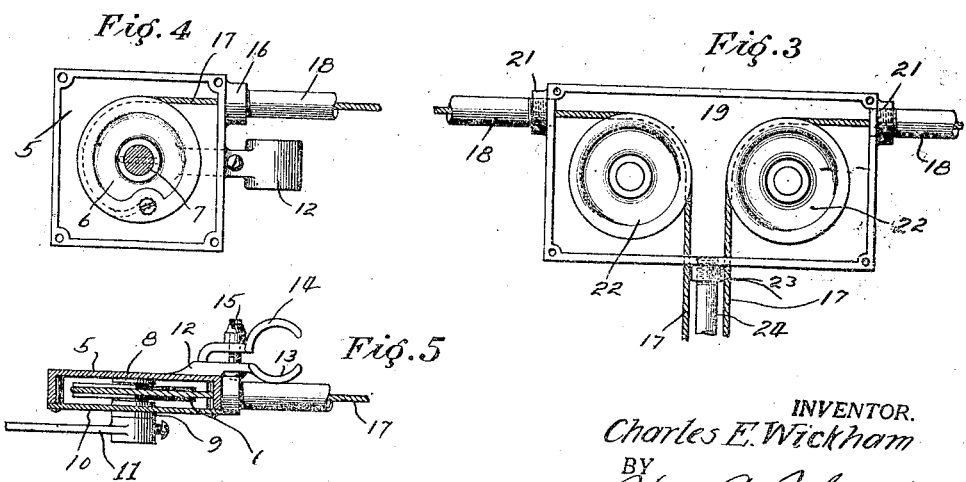
INVENTOR.
Charles E. Wickham
BY
ATTORNEYS.

UNITED STATES PATENT OFFICE.

CHARLES E. WICKHAM, OF OAKLAND, CALIFORNIA.

AUTOMOBILE-SIGNAL.

1,299,080.      Specification of Letters Patent.      Patented Apr. 1, 1919.

Application filed May 5, 1915. Serial No. 25,942.

*To all whom it may concern:*

Be it known that I, CHARLES E. WICKHAM, a citizen of the United States, residing at Oakland, in the county of Alameda and State of California, have invented certain new and useful Improvements in Automobile-Signals, of which the following is a specification.

This invention relates to improvements in signals of the type particularly adapted to give warning to a following or approaching driver that the vehicle is about to turn to the right or left.

The principal object of my invention is to provide a signal, which is easily operated, which is of sufficient size and so positioned that the same can be easily seen by the driver of an approaching or a following vehicle.

Another object of my invention is to provide a device, which may be readily attached to an automobile without any change in the construction thereof, which is simple in construction and operation and is thereby not liable to become disarranged.

Still another object of my invention is to so arrange the signal that the same is equivalent to the customary practice of throwing the hand out at one side or the other of the vehicle as a signal to the following driver that the car is about to make a turn in the corresponding direction.

With these and other objects in view my invention consists in the novel construction, combination and arrangement of parts as herein described and more specifically pointed out in the appended claims.

Reference being had to the accompanying drawing forming a part of this specification, Figure 1 is a view in elevation of a portion of an automobile showing my improved signal installed thereon.

Fig. 2 is a view in section looking toward the wind shield showing my device installed thereon.

Fig. 3 is a view in plan of a pulley casing used in connection with my device, the cover plate thereof being removed.

Fig. 4 is a view in elevation of a casing in which the signal arm is pivotally mounted.

Fig. 5 is a view in section through the last mentioned casing showing the manner in which the same is clamped to the supporting structure.

Fig. 6 is a view in plan of the mechanism attached to the steering wheel post by which the signal is operated.

Referring to corresponding parts by the same numerals of reference, 1 denotes in general an automobile having the wind shield 2 framed in the side bars 3. My improved signals are denoted in general by 4 and one is mounted on each side, preferably on the wind shield. Each of these signals consists of a casing 5 having mounted therein the grooved wheel or actuator 6, which is keyed to the shaft 7, which in turn is journaled in a bearing 8 in the back of casing and extends through a bearing 9 in the removable front plate 10, and on this extended end is attached the semaphore arm 11.

On the back of the casing 5 is formed an extension 12 having the portion 13 of such contour that it is adapted to fit the side bars 3, and 14 denotes a companion member, which is clamped to the side bar 3 by means of a screw or bolt 15. On the side of casing 5 is formed a boss 16 having a passageway therethrough for operating cable 17 and in threaded engagement with this lug is a tubular member 18 extending to the pulley casing 19, which is located directly in front of the steering wheel post 20, and which is provided with a threaded boss 21 engaging the ends of tubular members 18.

Pivotally mounted within the casing 19 are two grooved wheels 22 over which pass the cables 17. The front end of this casing is provided with a boss 23 having in threaded engagement therewith a tubular member 24 adapted to telescope within a larger similar member 25, and be clamped in position by a set screw or similar means. Denoted by 26 is a supporting member provided with a band portion 27 adapted to fit around the steering post 20 and to be clamped thereon by means of a screw 28. The tubular member 25 being held between the extended ends of this clamping portion on the same screw 28 and thereby permitted to assume various angles with respect thereto to accommodate the different angles of the steering posts.

Extending from the sides of the clamping band are segments 29 and 30 having notches 31 to hold the operating levers 32 in predetermined positions. These levers are pivotally mounted as at 33 and have the cables 17 attached to the same as shown at 34.

Small groove wheels 35 are pivotally mounted in the sides of band 27 around which this cable passes to bring the same close to the tubular members 25.

Having thus described my improved device its operation is as follows:—

When either of the levers, say, the right hand one is pulled downwardly its cable 17 is pulled around the grooved wheel 35 and 22, thereby rotating the corresponding wheel 6 and shaft 7 raising the arm 11 carried thereby to the position shown in dotted lines in Fig. 2. This movement is such that the arm is raised 90 degrees upon the rotation of the handle 32 to the lower notch 31, the handle automatically dropping into this notch to retain the lever in its raised position. When the handle is released from the notch the arm drops by gravity to its normal position carrying with it the cable and the operating lever.

What I claim as new and wish to cover by Letters Patent is:—

1. An improved automobile signal comprising a supporting member having means whereby it may be attached to a support, levers pivotally attached to said supporting member, two spaced-apart signal devices each having means whereby it may be attached to a windshield or similar support distant from the supporting member, flexible connections between said levers and the signal devices, guides for the flexible connections interposed between and rigidly supported by both of the signal devices, and bracing means connecting said supporting member and said guides.

2. An improved automobile signal comprising a supporting member having means whereby it may be attached to a support, levers pivotally attached to said supporting member, spaced-apart casings having means whereby they may be attached to a wind shield or similar support distant from the supporting member, signal members supported by both of said casings, flexible connections between said levers and said signal members, and guides for the flexible connections, said guides rigidly connecting said casings, and bracing means connecting said supporting member and said guide.

3. An improved automobile signal comprising a supporting member having means whereby it may be attached to a support, levers pivotally attached to said supporting member, two spaced-apart signal devices each having means whereby it may be attached to a wind shield or similar support distant from the supporting member, tubular guides interposed between and supported by both of said signal devices, flexible connections between the levers and the signal devices and working in said guides, and adjustable bracing means connecting said supporting member and said tubular guides.

4. An improved automobile signal comprising a supporting member having means whereby it may be attached to a support, levers pivotally attached to said supporting member, two spaced-apart signal devices each having means whereby it may be attached to a wind shield or similar support distant from said supporting member, rigid guides interposed between and supported by both signal devices, flexible connections between the levers and the signal devices and passing through said guides, and telescoping bars connecting said guides and said supporting member.

5. An improved automobile signal comprising a supporting member having means whereby it may be attached to a support, levers pivotally attached to said supporting member, two spaced-apart signal devices each having means whereby it may be attached to a wind shield or similar support distant from said supporting member, rigid guides interposed between and supported by both signal devices, flexible connections between the levers and the signal devices and passing through said guides, a bar rigidly connected with said guides, and a second bar telescoping with the first mentioned bar and pivotally connected with said supporting member.

In testimony whereof I affix my signature.

CHARLES E. WICKHAM.